May 11, 1948.  P. H. DIXON  2,441,220
VALVE
Filed April 18, 1944
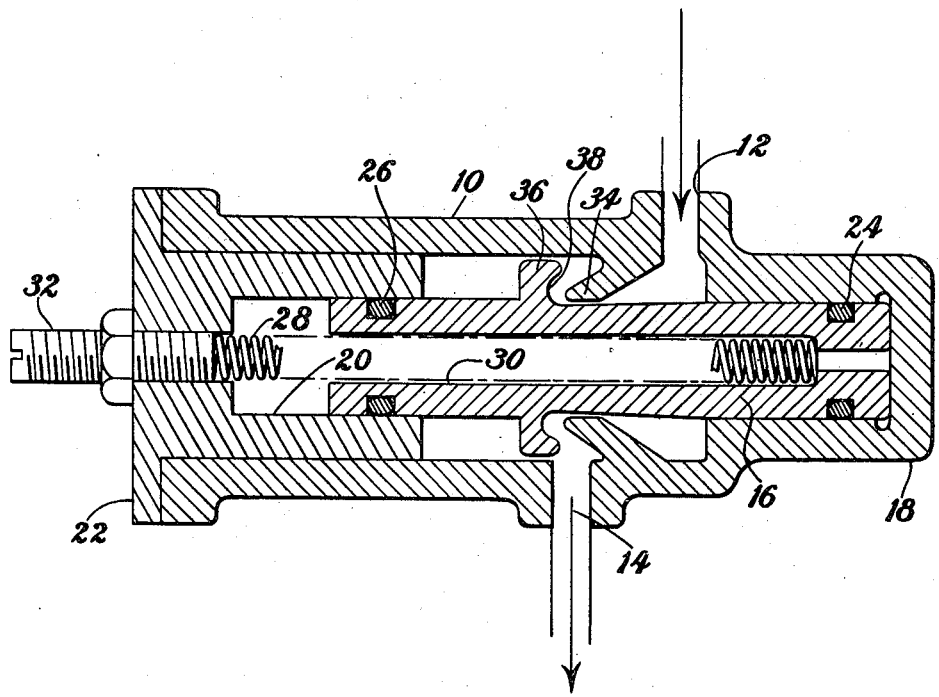
*Inventor*
*Paul H. Dixon*
By his Attorney Patented May 11, 1948

2,441,220

UNITED STATES PATENT OFFICE 2,441,220

VALVE

Paul H. Dixon, Wenham, Mass., assignor to United Shoe Machinery Corporation, Flemington, N. J., a corporation of New Jersey Application April 18, 1944, Serial No. 531,596

1 Claim. (Cl. 137—152)

This invention relates to fluid flow control mechanisms and more particularly to valves for automatically controlling the flow of fluid-pressure-operated member.

It is an object of the invention to provide an improved valve mechanism of simplified construction for controlling the flow of fluid to a fluid-pressure-operated member in a manner to maintain the flow substantially constant regardless of variations in input or back pressures. To this end and in accordance with a feature of the invention, the valve comprises a casing having a slide valve member forming with an inwardly directed flange in the casing a variable restriction for the passage of fluid. The jet formed by the fluid passing between the flange and the valve member acts upon a flange carried by the valve member to position the valve member in accordance with the velocity of the fluid thereby to maintain the flow through the valve substantially constant at all times.

The above and other features of the invention will be more particularly described by reference to accompanying drawing and pointed out in the claim.

In the drawing the single figure illustrates a vertical section through one form of valve in which the invention is embodied.

The valve comprises a casing 10 provided with a fluid inlet 12 and an outlet 14 which are offset with respect to each other. Slidable in the casing is a valve member 16 the end portions of which are cylindrical in cross section, the right end of the valve being received by a cylindrical portion 18 of the valve casing. The other end of the valve member slides in a cylindrical bore 20 of a cap 22 suitably secured to the other end of the valve casing. The valve member is provided with packing rings 24 and 26 to seal the ends of the valve member against leakage of fluid. The valve is urged into the position shown in the drawing by a spring 28 seated in a bore 30 of the valve member and engaging at its outer end an adjustable screw 32 by which the force exerted by the spring may be readily adjusted.

Extending inwardly from the valve casing 10 between the inlet 12 and the outlet 14 is a flange 34 which terminates adjacent to the valve member 16 and forms therewith an annular restricted passageway. The valve member is formed with a flange 36 having a cup-shaped surface 38 against which the fluid passing through the restricted passageway impinges with a force that varies according to the velocity of the fluid flow between the flange 34 and the valve member 16. When this force exceeds that exerted by the spring 28 the valve member 16 is moved to the left against the force of the spring. The valve member is tapered from its cylindrical portion at the right-hand end toward the flange 36 so that as the valve member moves toward the left, the space between it and the flange 34 decreases in accordance with the extent of movement of the valve member. Thus the valve member will be moved until the force of the jet from the restriction between the flange 34 and the valve member is balanced by the force exerted by the spring on the valve.

Assuming a constant inlet pressure at 12 and a heavy load on the member driven by the fluid passing from the outlet 14, the spring 28 will maintain the valve in the position shown. Should the load on the fluid-operated member drop substantially, the force of the fluid engaging the flange 36 will increase accordingly and thus cause the valve member to move to the left until the cross-sectional area of the restriction decreases to the point where a balance is attained between the force of the fluid on the flange and the spring 28. The valve member will accordingly assume a position dependent upon the load so that the flow through the outlet 14 will remain constant at all times. The same result will be obtained if the pressure of fluid in the inlet 12 varies, and accordingly the member driven by the fluid will operate at a constant rate regardless of normal variations in the inlet pressure or the load on the member. It will be understood that this rate may be varied by adjusting the screw 32 thereby varying the effect of the spring 28 on the valve member.

Having thus described the invention, what I claim as new and desire to secure by Letters Patent of the United States is:

A valve comprising a casing closed at opposite ends, a valve member in the casing supported at its opposite ends for sliding movement therein, said casing having inlet and outlet ports in the side thereof spaced lengthwise of the casing, an inwardly extending flange carried by the casing between the inlet and outlet ports, said valve member having a tapered portion cooperating with said inwardly extending flange to provide a variable restriction for fluid passing through the casing from the inlet to the outlet, a cup-shaped flange carried by said valve having a concave face subject to the force of the fluid passing through said restriction and positioned to cause movement of the valve member to decrease the size of said restriction in response to an increase in the velocity of the fluid, and a spring urging said valve member in the opposite direction.

PAUL H. DIXON.

REFERENCES CITED

The following references are of record in the file of this patent:

UNITED STATES PATENTS

| Number | Name | Date |
| --- | --- | --- |
| 257,069 | Reznor | Apr. 25, 1882 |
| 1,605,269 | Myer | Nov. 2, 1926 |
| 1,813,122 | Moore | July 7, 1931 |
| 1,933,852 | Hahn | Nov. 7, 1933 |